United States Patent [19]

Pommerening et al.

[11] 3,999,019
[45] Dec. 21, 1976

[54] PRIVATE AUTOMATIC BRANCH EXCHANGE PROVIDING LINE APPEARANCE CONNECTION OF OPERATOR COMPLEX TO SINGLE STAGE MATRIX

[75] Inventors: Uwe A. Pommerening, Webster; Glenn L. Richards, Caledonia, both of N.Y.

[73] Assignee: Stromberg-Carlson Corporation, Rochester, N.Y.

[22] Filed: Mar. 25, 1975

[21] Appl. No.: 561,797

[52] U.S. Cl. .......................................... 179/27 FF
[51] Int. Cl.² ........................................ H04Q 3/00
[58] Field of Search ......... 179/27 FF, 27 F, 27 CA, 179/18 AD, 18 DA, 18 EB, 8 R

[56] References Cited
UNITED STATES PATENTS

| | | | |
|---|---|---|---|
| 3,197,568 | 7/1965 | Wedmore et al. | 179/27 CA |
| 3,426,158 | 2/1969 | Browne et al. | 179/27 CA |
| 3,786,194 | 1/1974 | Pinede et al. | 179/18 AD |
| 3,789,151 | 1/1974 | Richards | 179/18 GF |
| 3,859,473 | 1/1975 | Brown et al. | 179/27 CA |

Primary Examiner—Thomas W. Brown
Attorney, Agent, or Firm—Donald R. Antonelli; William F. Porter, Jr.

[57] ABSTRACT

An electronic private automatic branch exchange may avoid the need for access trunks and information trunks in the operator complex by utilizing a single stage switching matrix to effect connections between line circuits, trunk circuits, and the operator under control of the common control. To accomplish this the operator line circuits are provided and operator loop circuits as line appearances at the inputs of the matrix. In addition, the common control is provided with recognition circuitry for recognizing a request from a line for connection to the operator or a request by the operator for connection to a line and conversion circuitry for converting such requests to a multidigit designation of the operator line circuit or loop circuit to be acted upon by the system in the manner of a connection of a line circuit.

8 Claims, 7 Drawing Figures

PRIVATE AUTOMATIC BRANCH EXCHANGE PROVIDING LINE APPEARANCE CONNECTION OF OPERATOR COMPLEX TO SINGLE STAGE MATRIX

The present invention relates in general to telephone systems, and more particularly to improvements in private automatic branch exchanges.

The conventional private automatic branch exchange includes various types of trunk circuits which perform particular functions within the system. In association with the operator complex, there are normally provided both information trunks and access trunks, both of which are necessary to provide interconnection between the operator and the parties in the system as well as to gain access to outgoing lines.

The information trunk is used to connect a party within the system to the operator. Thus, if a party wishes to contact the operator for one reason or another, a designated digit, such as 0, is dialed, in response to which the system will connect the party through an information trunk to the operator. An access trunk is used when the attendant wishes to be connected to a party within the system or to an outgoing line. In conventional systems, the information trunks and access trunks are definite pieces of hardware including a plurality of coils and relays which are necessary to effect the necessary connections required of the trunk. These trunks are normally assigned on a traffic basis so that the number of trunks required by the system depends upon the traffic which is to be handled by the system. As such, the information trunks and access trunks represent a significant cost and add to the complexity of the system.

In the conventional telephone system, since the communication connection is normally established on the basis of a sleeve lead connection through the various switching networks from one element to another, once a call is established through a trunk, such as an information trunk or an access trunk, that trunk must normally be retained for the duration of the call in spite of the fact that it may not serve any other purpose but to maintain the connection through the system on the sleeve lead. For example, if a party contacts the attendant for purposes of obtaining a connection to an outside line, the party will gain access to the operator through an information trunk. The attendant may then effect a connection to an outside line through an outgoing trunk circuit and then extend the call which comes through the information trunk to the outgoing trunk circuit; however, the information trunk must remain in tandem with the outgoing trunk for the duration of the call or else the sleeve lead connection between the party and the outgoing trunk circuit will be broken and the call will be lost. The same type of situation may occur in connection with an access trunk. If the operator initiates a call to a party outside of the system using an outgoing trunk and then wishes to transfer that connection to a party within the system, she must go through an access trunk to the outgoing trunk to establish the outside call and then may transfer the access trunk to a party within the system; however, the access trunk must remain in tandem with the outgoing trunk to maintain the sleeve lead connection through the system or else the call will be lost.

It is an object of the present invention to provide a private automatic branch exchange which is capable of performing all of the standard operator functions without the need for the formation trunks and access trunks.

It is an object of the present invention to provide a private automatic branch exchange requiring fewer trunk circuits with a consequent decrease in the cost and complexity of the system.

It is a further object of the present invention to provide a private automatic branch exchange in which the operator functions may be performed without the need for information trunks and access trunks.

In accordance with the present invention, the private automatic branch exchange includes a single stage switching matrix to which the operator position circuits are connected as line appearances in the manner of the line circuits and the connection between the operator position circuits and other parties within the system as well as outgoing trunk circuits is effected simply by selective switching of this single stage matrix. The system in accordance with the present invention is controlled by a common control which includes special circuitry associated with the operator complex which recognizes requests for service by the operator and controls the necessary switching in the single stage switching matrix to effect the required connections to the operator position circuits.

These and other features, advantages and objectives of the present invention will become more apparent from the following detailed description of the present invention, when taken in connection with the accompanying drawings, which illustrate one exemplary embodiment of the present invention, and wherein.

Figure 1A:
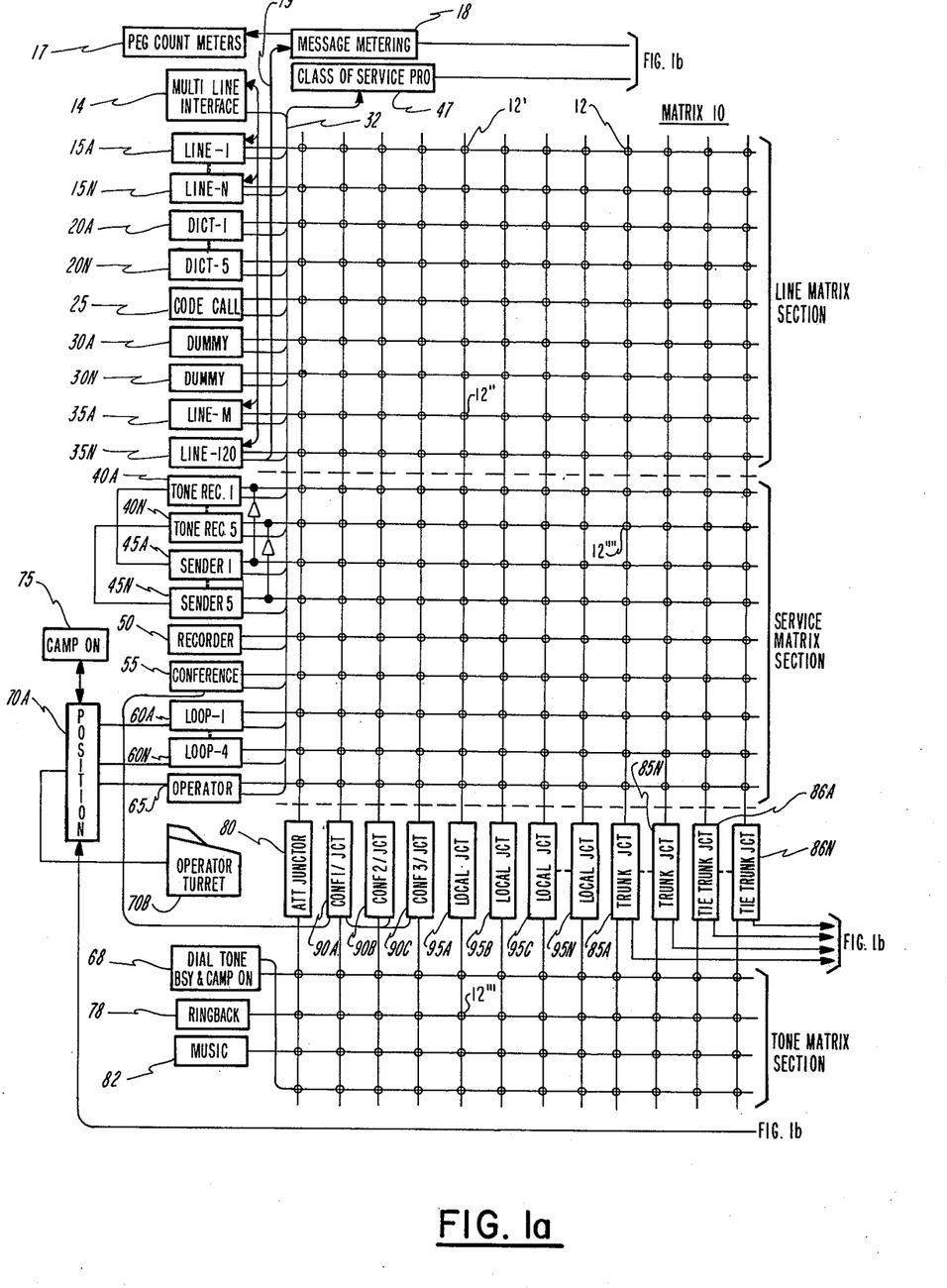
FIGS. 1a and 1b, when combined, are a schematic block diagram of a private automatic branch exchange of the type to which the present invention is applicable.

The present invention has application, for example, in an electronic private automatic branch exchange of the type described in copending application Ser. No. 431,928, now U.S. Pat. No. 3,943,297, issued Mar. 9, 1976, which includes a switching matrix 10 formed by integrated circuit techniques of a plurality of solid state cross point switches. The matrix 10 is a single stage rectangular array of cross points divided into three sections, i.e., a line matrix section, a service matrix section and a tone matrix section, as seen in FIG. 1a. The matrix serves to establish a low impedance electrical path for passing audio signals between a selected one of a plurality of input leads and a selected one of a plurality of output leads.

Line appearances are provided on the left side of the line matrix section, as seen in FIG. 1, including a plurality of line circuits 15a through 15n and 35a through 35n. Between the line circuits there are provided connections to special lines which take the place of regular lines in the system. These special lines are dictation access circuits 20a through 20n, a code call circuit 25 and a plurality of dummy line tie trunks 30a through 30n.

Line appearances at the service matrix section take the form of a plurality of tone receivers 40a through 40n, a plurality of register senders 45a through 45n, an intercept recorder 50, a conference bridge 55, and in accordance with the present invention, a plurality of operator loop circuits 60a through 60n and an operator line circuit 65 are connected directly to the matrix. The number of tone receivers, register senders and operator loop circuits, like the number of line circuits connected to the line appearance inputs of the matrix 10 depend upon the traffic requirements and size of the system. It will be obvious from the following description that an increase or decrease in the number of these circuits is easily accomplished by merely changing the overall size of the matrix 10.

The outputs of the matrix 10 are provided in the form of a plurality of junctor appearances, as seen in FIG. 1, the junctor appearances are associated with an attendant junctor 80, a plurality of conference junctors 90a through 90c, a plurality of local junctors 95a through 95n, a plurality of trunk junctors 85a through 85n and a plurality of tie trunk junctors 86a through 86n. The trunk junctors 85a through 85n are connected to corresponding trunks 89a through 89n, and the tie trunk junctors 86a through 86n are associated with corresponding tie trunks 87a through 87n.

The tone matrix section of the matrix 10 provides inputs on respective lines from a combined dial tone generator and busy-camp-on tone generator 68, along with inputs from a ring-back tone generator 78 and music source 82. The outputs of the tone matrix section are connected through the respective junctors to the junctor appearances of the line and service matrix sections of the matrix 10.

The operator complex includes in addition to the loop circuits 60a through 60n and the operator line circuit 65, an operator position circuit 70a to which is connected an operator turret 70b. The important feature to note with respect to the present invention is that these circuits are connected to the matrix as line appearances in the same manner as a line circuit. The advantages of this type of connection will be described in more detail hereinafter. A camp-on circuit 75 providing a special feature in the system is also connected to the operator position circuit 70a. As another special feature of the system, a message metering circuit 18 and one or more peg count meters 17 are associated with the line circuits via a bus 19.

The matrix 10 functions to selectively connect an input from a line to a selected junctor by closing the appropriate cross point in the line matrix section and to provide an appropriate tone through the selected junctor to the line by closing the appropriate cross point in the tone matrix section. Connection from one line to another line is also effected by closing the pair of cross points in the line matrix section associated with the respective lines and a common junctor.

The matrix 10 is designed to carry only the audio communication between lines or between a line and a trunk. The signaling associated with the establishment of the communication connection through the matrix 10 is handled outside of the matrix via a common bus 32 through a class of service programmer 47 connected to the common control equipment 100.

Figure 1B:
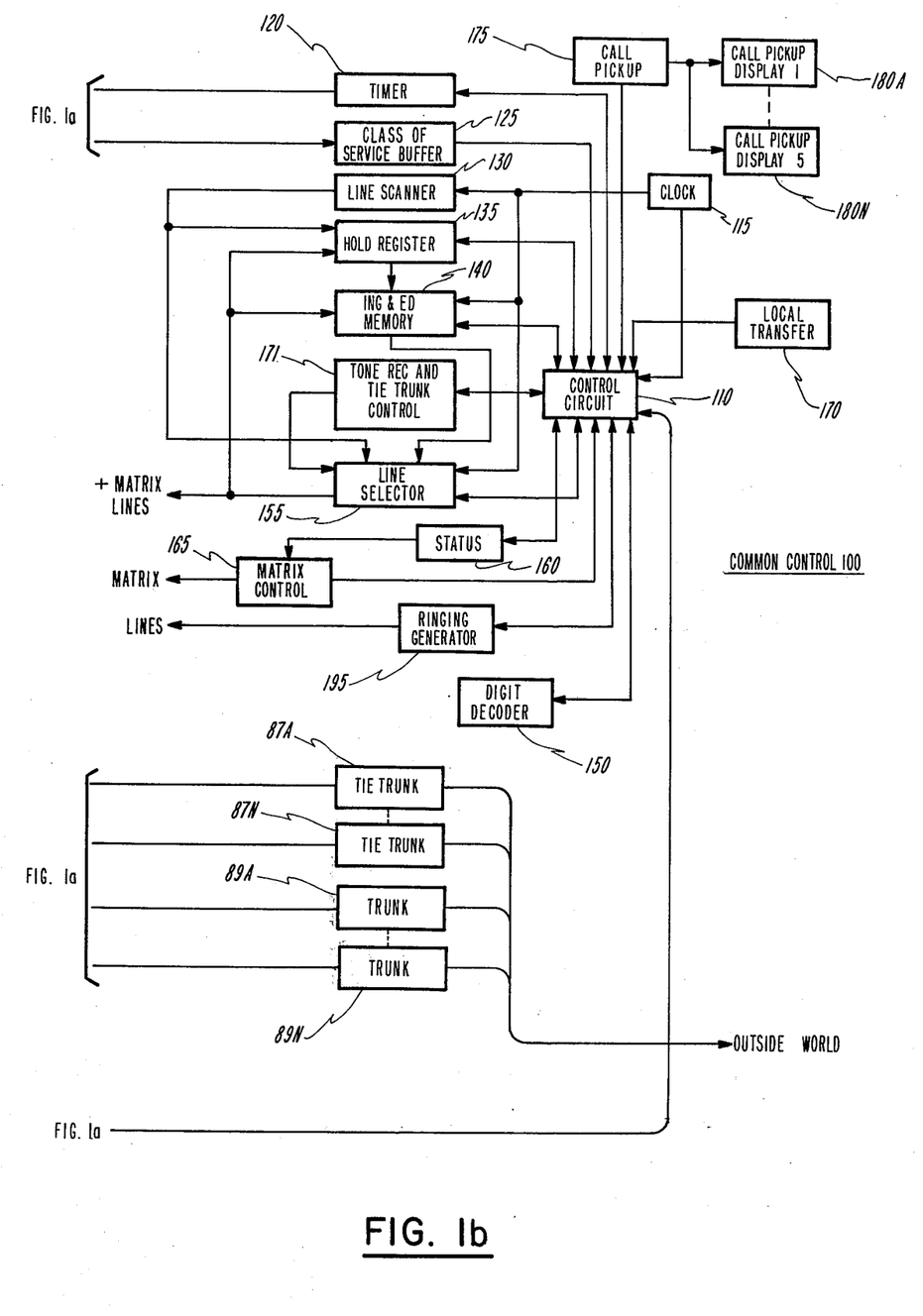

FIG. 1b schematically illustrates the various elements of the common control 100, the heart of which is formed by a plurality of control circuits 110 in the form of a hard-wired programmer. The timing of the various functions which are performed in the system under control of the control circuits 110 is regulated by the various timing signals produced by a clock 115, which is directly connected to the line scanner 130, which serves to generate the line scanning signals, and is connected through the control circuits 110 to the various other elements in the common control 100 to provide a time base for the various functions thereof.

A timer 120 is also provided in the common control 100 to analyze the information concerning the line conditions and other information from the junctor and perform memory timing functions within the system. For example, on-hook an off-hook timing, time-outs, flash detection and other conventional timing functions are performed by the timer 120. In this regard, the timer 120 operates with the control circuits 110 to perform whatever timing functions are necessary within the system.

A class of service buffer 125 forms an interface between the class of service programmer 47 and the logic circuitry of the common control 100. Thus, the various line conditions which are derived through the class of service programmer 47 each time a line is addressed will be passed to the control circuits 110 through the class of service buffer 125.

The line scanner 130 is driven from the clock 115 and serves to scan each of the lines in turn continuously to detect requests for service. In this regard, the lines are addressed by the line scanner in conjunction with the scanning of the junctors, a line being addressed from the line scanner at the end of each complete scan of all of the junctors, as will be described in greater detail in connection with line selection and matrix control operation. Each time a line is addressed by the line scanner 130, the calling bridge relay information within the line is forwarded via the common bus 32 and the class of service programmer 47 to the control circuits 110 in the common control 100 via the class of service buffer 125. In this way, the status of the line, i.e., whether or not it is requesting service of the system, is monitored during the continuous scanning of the lines by the line scanner 130.

A hold register 135 is provided as a temporary memory which is used for various systems operations in conjunction with information stored in conjunction with the various junctor circuits. As will be described in greater detail, the system stores the identity of the lines associated with any junctor during the entire duration of a call in the system, so that during the establishment of the communication connection between parties and in providing various functions requested by the parties during the call, it is necessary at various times to temporarily store information as functions are being performed within the system by the common control 100. The hold register 135 provides the temporary storage capability in the system.

The system includes an ing and ed or junctor memory 140 which forms the basic junctor memory storage for the calling and called numbers identifying the lines associated with each of the junctors. The memory 140 includes storage positions assigned to each of the junctors, which storage positions assigned to each of the junctors, which storage positions are continuously scanned by clock signals derived from the clock 115. Thus, if a junctor is associated with one or more lines, the scanning of the portion of memory 140 assigned to that junctor will produce the calling and/or called numbers of those lines which are stored therein. In this way, the identity of the cross points in the matrix 10 associated with the line or lines involved with the junctor can be identified.

A line selector 155 receives line designations from the line scanner 130 and from the junctor memory 140, and in response to the clock signals from the clock 115 selectively addresses cross points in the matrix 10 and selected lines at the proper times. The solid state cross point matrix 10 is formed of switches which operate such that addressing alone of the cross point will open the cross point, while addressing in combination with a positive request signal for actuation of the cross point will close the cross point. Whether or not the cross point is to be opened or closed is determined by the status of the call based upon the progress of the connection as determined by the control circuits 110 from the information derived from the lines via the class of service programmer 47 and class of service buffer 125. The system control progresses in states, with the individual states being monitored by the status circuit 160, which stores the state in which any particular call is in and advances under control of the control circuits 110 as the call progresses from one state to the next in a particular program. Thus, the information concerning the desired condition of the cross point, i.e., whether it is to be open or closed, is derived from the status circuit 160. If the cross point which is addressed from the line selector 155 is to be closed for a particular call, a matrix control 165 will receive information from the status circuit 160 to this effect and generate a positive request signal for closing of the cross points. If the cross points are not to be closed, the matrix control 165 will produce no output as the cross points are addressed, thereby effecting an automatic opening of the cross points.

A ringing generator 195 of any known form is provided for application of ringing current to the lines under control of the control circuits 110. While the ringing generator is in itself a conventional circuit, the application of ringing to the line in the system of the present invention is somewhat different than known systems in view of the multiplex addressing of the various lines by the common control. Thus, the output of the ringing generator 195 may be connected simultaneously to all lines since the lines are addressed in turn during the scanning of the junctors associated therewith. In this way, the system requires only a single ringing generator, thereby materially simplifying the system and reducing the costs thereof.

The digit decoder 150 performs analysis of the incoming digits and makes decisions concerning these received digits. For examples, the digits received by the digit decoder 150 are analyzed for line-to-line calls, line-to-trunk calls, toll restrictions and other information. The information provided by the digit decoder 150 then serves to initiate various control functions within the control circuits 110 as the various states of the call progress.

As a special feature, the system also provides a transfer circuit 170 which effects transfer between lines and between trunks and lines, as may be required.

A further special feature is embodied in a call pickup arrangement including a call pickup circuit 175 and a plurality of call pickup displays 180a through 80n. In accordance with this special feature, a party may respond to a call to another party identified on the call pickup display.

The function of the various elements of the system of the present invention will become clearer from a general description of various basic functions of the system.

BASIC SYSTEM OPERATION

The lines are continuously scanned from the line scanner 130 via the line selector 155 in the common control 100, so that a subscriber line circuit, operator loop circuit or operator line circuit requesting service will ultimately be addressed permitting the state of the calling bridge relay in the line circuit to be passed on through the class of service programmer 47 along with class of service information concerning that line circuit to the common control 100. Assuming that the line circuit 15a has gone off-hook and is requesting service, this line will ultimately be addressed by the line selector when the line scanner 130 reaches this line in its scan of all of the lines. At the same time, the line selector 155 will also address all of the cross points of the matrix 10 associated with that line circuit. In this case, all of the cross point associated with the line circuit 15a along the first horizontal of the matrix including the cross point 12' will be addressed.

If, as a result of some misoperation, one or more of these cross points has been inadvertently closed, the addressing of the cross points at this time will automatically open the cross points in the absence of positive control from the matrix control 165 indicating that one or more of these cross points should be closed. Since line 15a has just requested service, none of the cross points should be closed and therefore the status circuit 160 will provide no indication to the matrix control 165 that any of the cross points involved should be closed. In view of the fast scanning times provided within the system for scanning the lines and junctors, it can be seen that a misoperation of a cross point will be immediately corrected so that no effect upon any communication connection through the matrix will result, nor will such cross point misoperation be noticeable to either party except for a click as the cross point is opened or closed to correct the state thereof. Further details concerning the unique operation of the matrix under control of the line scanner 130, line selector 155 and matrix control 165 are disclosed in our copending application Ser. No. 431,878, filed Jan. 9, 1974, now U.S. Pat. No. 3,903,374, issued Sept. 2, 1975, and assigned to the same assignee as the present application.

When the conrol circuit 110 receives an indication through the class of service buffer 125 that the line circuit 15a has requested service, the control circuits 110, which include a junctor allotter, will assign a free junctor to the line circuit and request that the calling line number of the line circuit 15a be stored in the junctor memory 140 in the time position assigned to the selected junctor. The control circuits 110 will also address the status circuit 160 to record in the memory thereof that the call associated with the selected junctor is in the first state of operation. Assuming that the junctor allotter in the control circuits 110 selects the local junctor 95a, the calling line number of the line circuit 15a will be stored in the memory position of the junctor memory 140 permanently assigned to the local junctor 95a, and each time the junctors are scanned, the line number of the calling line 15a will be forwarded to the line selector so that the line 15a can be addressed at this time and the cross point associated both with the line 15a and the junctor 95a, i.e., the cross point 12' can be addressed. The status circuit 160 indicates to the matrix control 165 that the call is in a state wherein the cross point 12' should be closed, and therefore, the matrix control 165 will forward a positive request for closing the cross point 12' at the time the cross point is addressed. As a result, the line circuit 15a will be connected through the matrix 10 to the local junctor 95a.

At the same time that the cross point 12' is addressed and closed to enable connection between the line circuit 15a and the local junctor 95a, the matrix control 165 under control of the status circuit 160 addresses the cross points of the tone matrix section of the matrix 10 associated with the dial tone generator 68 so that the cross point 12''' will be closed connecting the dial tone generator 68 through the local junctor 95a to the line circuit 15a. The line circuit may then commence to dial the number of the party to which it desires connection.

The control circuits 110 in the common control 100 will advance the status circuit 160 of the particular junctor 95a to state 2 if the calling line circuit has rotary dial equipment or to state 3 if the calling line circuit has tone dial equipment, as determined from the class of service information for that line circuit received from the class of service programmer 47. Each time the junctor 95a is scanned, the number of the calling line circuit 15a will be provided by the junctor memory 140 to the line selector 155 which will address the line permitting the calling bridge relay state to be monitored via the bus 32 and class of service programmer 47 in the common control 100. The digit decoder 150 will accumulate the calling bridge relay states and provide to the control circuits 110 the digit information which will be stored in the memory portion of the junctor memory 140 assigned to the junctor. Eventually, the junctor memory 140 will have stored in the portion thereof assigned to the junctor 95a both the calling and called line numbers.

When it is determined by the timer 120 that the calling line 15a has completed dialing, the control circuits 110 will advance the status circuit 160 to record state 4 in the position of the memory thereof assigned to the junctor 95a. State 4 relates to busy test of the called line circuit. If the called line circuit is found to be busy, the tone matrix section of the matrix 10 is once again addressed from the matrix control 165 to connect busy tone from the generate 68 through the local junctor 95a to the calling line circuit 15a. On the other hand, if the called line circuit is free, the control circuits 110 will advance the status recorded in status circuit 160 to state 5 for application of ringing from the ringing generator 195 to the called line circuit and to address the tone matrix section of the matrix 10 to connect the ring back tone generator 78 through the local junctor 95a to the calling line circuit 15a. The control over the tone matrix section of the matrix 10 to provide for connection of dial tone, busy tone, ring back tone and music to the lines through selected junctors is described in greater detail in our copending application Ser. No. 431,885, filed Jan. 9, 1974, now U.S. Pat. No. 3,904,831, issued Sept. 9, 1975, and assigned to the same assignee as the present application.

The matrix control 165, upon receiving the calling and called line numbers from the junctor memory 140 as the junctor 95a is scanned, will address the cross point 12' and also the cross point associated with the called line, for example, cross point 12'' associated with the line 35a. Thus, when the called party answers in response to the applied ringing, he will be connected via cross point 12' and 12'' in the matrix 10 to the calling party, and the respective line circuits 35a and 15a will receive ground to maintain cross point bias from the local junctor 95a for the duration of the call. At this time, the status circuit 160 is advanced by the control circuits 110 to status 7, indicating to the system that a local call is in progress.

Where the lines are equipped with tone dial equipment, this class of service for the line circuit is indicated to the common control by the class of service programmer 47. In this regard, the class of service programmer 47 typically includes a panel having selected class of service plugs so that the features of the system may be allocated on a per line basis and the information with respect thereto may be provided to the common control. Thus, in addition to providing a path for the calling bridge relay information from the lines, the class of service programmer 47 also submits at this time class of service data concerning the particular line for use by the common control 100.

When a call is in state 3 indicating a call originating from tone dial equipment, the common control 100 effects connection via the matrix between the calling line and an available one of the tone receivers 40a through 40n. The tone receiver converts the tone dial into the corresponding binary number, which is received by the common control 100 via bus 32 and placed into the ing and ed memory 140.

Since the operator loop circuits 60a through 60n are merely provided as line appearances at the input of the matrix 10, the functions associated with the operator position are greatly simplified. Because of the fast switching capability of the cross points in the matrix 10, the split functions normally associated with incoming connections to the operator may be performed with the matrix cross points. Thus, special trunk circuits having separate operator access with split tip and ring pairs, as normally required in conventional systems, are not required in the system of the present invention. In addition, since the split functions are performed in the present system within the matrix 10 by selective operation of the cross points, the operator loop circuits and position circuits which normally control such functions can be greatly simplified. Since the operator loop circuits are effectively line circuits in the present system, switching a trunk to a line or to an operator is the same function for the system. This makes it also possible to greatly simplify the loop circuits.

Since the junctor controls the cross points for the required split functions in connections to the operator complex, hardware for special trunks, like information trunks, is not required in the system. The junctor performs the information trunk duties without requiring extra equipment, thereby simplifying the system. Also, special access trunks for the operator, which are usually quite complex, are not required. The junctor circuit once again takes care of the duties normally provided in this regard. In addition, due to the elimination of information trunk hardware, tandem operation for operator extended calls to trunks between information trunks and the central office trunks is not required. The operator is accessed by the line via the local junctor which acts as the information trunk, and when the operator extends the call to a central office trunk, the local junctor is dropped and the central office trunk junctor takes over the duties.

In outgoing trunk calls, it is necessary for the system to switch from a local junctor to a trunk junctor. In this regard, the line circuit is initially connected to a local junctor upon detection of the request for service in the manner described above by closing the cross point in the matrix 10 common to the line circuit and a selected available local junctor. In the foregoing example, by closing cross point 12', the line circuit 15a can be connected to the local junctor 95a. An addressing of the tone matrix section provides connection of the dial tone generator 68 through cross point 12''' and the local junctor 95a to the line circuit 15a. When dialing commences, the cross point 12''' is released disconnecting dial tone from the line circuit and the dialing impulses are received in the common control 100 via the class of service programmer 47. The digit decoder 150 for outgoing trunk calls will recognize the first digit as a request for access to a trunk circuit and the control circuits 110 will indicate the need to connect to a trunk junctor. The junctor allotter in the control circuits 110 will select an available trunk junctor, for example, junctor 85a connected to the trunk 89n.

CALLS TO THE OPERATOR

As already indicated, conventional PBX systems require a plurality of information trunks to effect connection of a party to the operator. The features and equipment provided in accordance with the present invention to eliminate the need for any information trunks in the system will now be described in conjunction with FIGS. 2 through 5.

Figure 2:
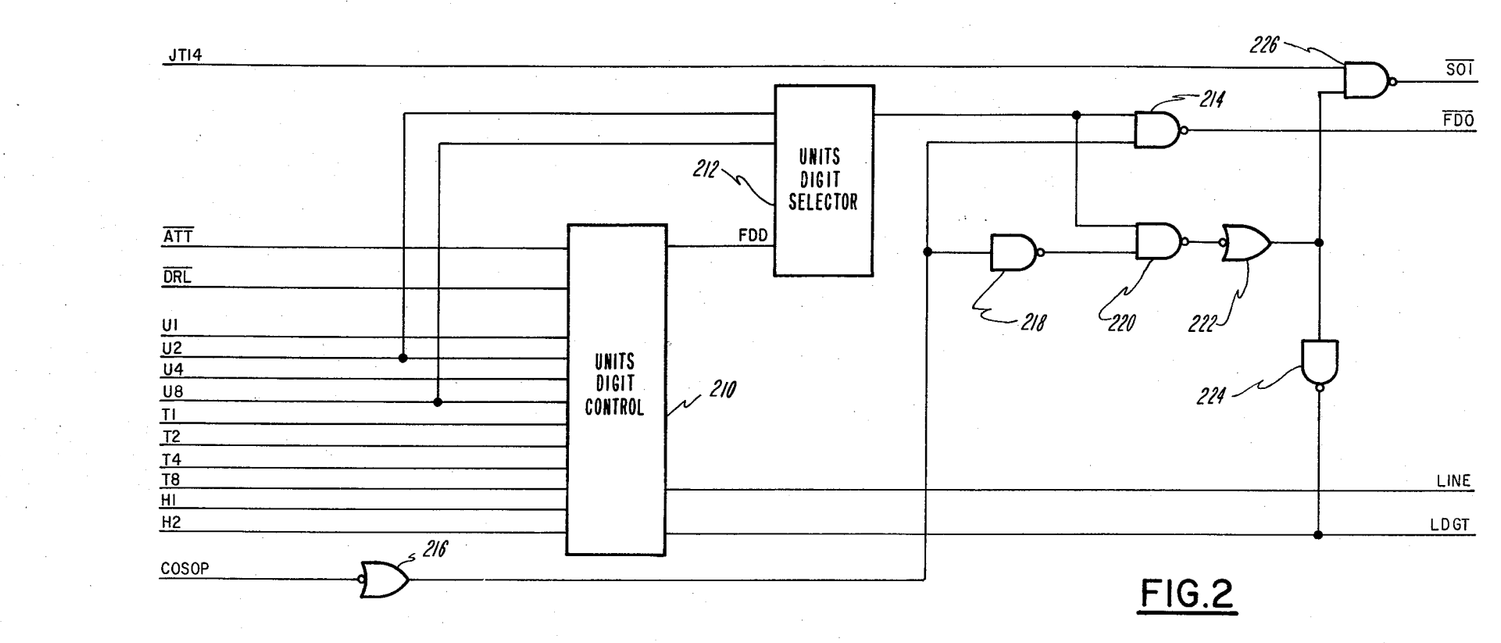
FIGS. 2 and 3 are schematic diagrams of a control circuit in accordance with the present invention.
Figure 3:
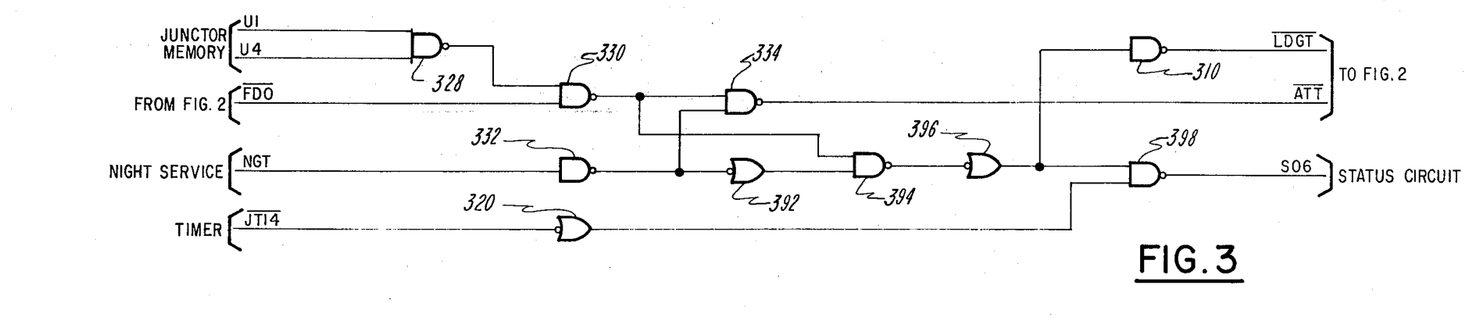

The basic circuitry which is included in the common control of the system for handling calls to the operator is illustrated in FIGS. 2 and 3, and consists of a units digit control 210 and a units digit selector 212 along with a small amount of logic circuitry to generate condition control signals. It is readily apparent from these figures that the circuitry necessary to eliminate the need for information trunks is less complex than an information trunk, thereby clearly indicating the advantages of the present invention from the point of view of system cost and complexity. The simplicity of the operation of this circuitry will also become apparent from the following description.

As the junctor memory is continuously scanned, the data stored in the ing and ed portions of each junctor time is applied to the digit decoder. This information is received at the units digit control 210 and analyzed in connection with the various requests represented by this digit information.

Figure 4:
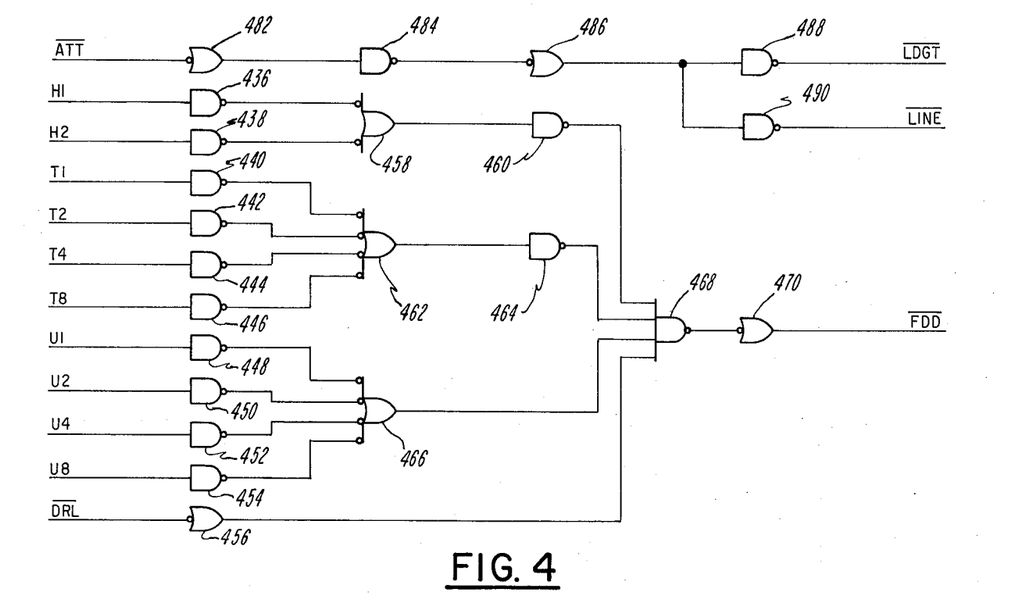
FIG. 4 is a schematic circuit diagram of the units digit control of FIG. 2.

FIG. 4 shows the details of the units digit control 210 which are applicable to the present invention. The units digit information is received on leads U1, U2, U4, and U8 at the input to gates 448, 450, 452, and 454, respectively, and the outputs of these gates are applied together to respective inputs of OR gate 466 to determine whether a units digit is present. If any one of the inputs to OR gate 466 is enabled, an output UP will be provided from the gate 466 to one input of AND gate 468, indicating that a units digit is present.

In a like manner, the tens digit information is provided on inputs leads T1, T2, T4, and T8 from the junctor memory to gates 440, 442, 444, and 446, the outputs of which are applied to respective inputs of OR gate 462 whose function is to determine whether a tens digit is present. If no one of the inputs to the OR gates 462 are enabled, the output of this gate will produce at the output of gate 464 a signal $\overline{TP}$ indicating that no tens digit is present, which output is applied to a second input of the gate 468.

The hundreds digit information is received on leads H1 and H2 at the inputs to gates 436 and 438, respectively, the outputs of which gates are applied to respective inputs of OR gate 458, which is provided to determine whether a hundreds digit is present. If neither one of the inputs to gate 458 is enabled, the output of this gate will produce a signal $\overline{HP}$ at the output of inverter gate 460, which output is applied to a third input of the gate 468.

As already indicated, one of the functions of the digit decoder is to determine from the information received from the class of service buffer and the status circuit the origin of various digit information. Thus, the digit decoder will provide a signal $\overline{DRL}$ upon determining that digit information was received from a local station. This signal $\overline{DRL}$ is received at the input of gate 456 and is applied to a fourth input to the gate 468. In analyzing the information which has been applied to the gate 68, it is seen that signal UP indicates that a units digit is present, signal $\overline{TP}$ and $\overline{HP}$ indicate that no tens or hundreds digits are present, and signal $\overline{DRL}$, indicates that the digit was received from a local station. Thus, gate 468 detects that the digit being processed is the first digit received. The signal FDD representing "first digit dialed" is provided from the output of gate 468 via gate 470.

The signal FDD provided from the units digit control 210 is applied to a units digit selector 212, as seen in FIG. 2, which serves to analyze the value of the particular units digit being processed. The standard binary designation is utilized to represent the various stored digits with the number 1 being represented by all zeros and the number 0 being represented by all ones. Since the unit position U8 will be a 1 only for the numbers 9 and 0, the number 9 being represented by 1000, a 1 at the binary position U8 and a 1 at any one of the other binary positions (such as U2 for example) will be sufficient to determine that the digit being processed is a zero.

Figure 5:
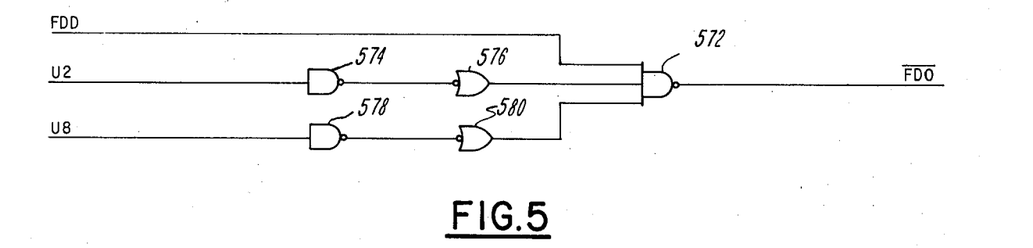
FIG. 5 is a schematic diagram of the units digit selector of FIG. 2.

As seen in FIG. 5, which illustrates the details of the units digit selector 212, the binary signal U2 is applied from the junctor memory via gates 574 and 576 to one input of AND gate 572. The binary signal U8 is also applied from the junctor memory through gates 578 and 580 to a second input of AND gate 572, the third input of which receives the signal FDD from the output of units digit control 210. If all of the inputs to gate 572 are enabled, the gate will produce an output signal $\overline{FDO}$ indicating that the first digit is a zero.

The signal $\overline{FDO}$ from units digit selector 212 is applied to one input of AND gate 220, the other input of which receives class of service information from the class of service buffer in the form of signal COSOP through gates 216 and 218. If the party who has dialed zero has the proper class of service to reach the operator, an output LDGT will be generated from the output of gate 220, via gates 222 and 224 indicating that the last digit has been received. This signal is applied to the common control to indicate to the system that no further digit information is needed to complete the communication connection requested. The output from gate 220 is also applied through gate 222 to an input of gate 226, which receives at a second input the junctor time signal JT14. An output $\overline{SO1}$ will be generated from the gate 226 during the junctor time JT14 to set the status decoder to the state $\overline{SO1}$. The system will then effect connection between the party and the operator in the same manner as a line-to-line call.

If the party generating the digit information does not have the proper class of service to reach the operator, gate 214, which receives the signal $\overline{FDO}$ from the units digit selector 212 will be enabled directly from the output of gate 216 to apply the signal $\overline{FDO}$ to one input of gate 330 in FIG. 3. The other input of gate 330 receives an output from AND gate 328, whose inputs receive the binary signals U1 and U4 from the junctor memory. The output from gate 328 serves to ensure that the units digit is a zero as already detected. The output of gate 30 is applied to one input of gate 334, whose other input receives night service information via gate 332. If the system has not been placed on night service, i.e., the operator position is still occupied, gate 34 will produce the output $\overline{ATT}$, which output is applied to the units digit control 210 in FIG. 2. The signal $\overline{ATT}$ is received at the input of gate 482, and is applied via gate 484 to gate 486, which produces an output $\overline{LDGT}$ via gate 488 indicating that the last digit has been dialed, which signal is applied to the common control to indicate that no further digit information is needed, as already indicated herein. The output of gate 486 will also be applied via gate 490 to provide the signal $\overline{LINE}$ to the common control to indicate to the system that the party initiating the call is attempting to reach the operator but does not have an operator class of service.

If the system has been switched to night service, gate 394 will be enabled from the output of gate 330 and the output of gate 332 applied via gate 392. This will in turn enable gate 310 from the output of gate 394 via gate 396 to produce the control signal $\overline{LDGT}$, which is applied to the common conrol to indicate that the last digit has been received for reasons set forth above. At the same time, gate 398 will be enabled at junctor time JT14 via gate 320 and the output of gate 396 to provide a signal $\overline{SO6}$, which will be applied to the status circuit to advance the status to state SO6 providing for night service.

The units digit information which is applied to the units digit selector 212 is forwarded to the junctor memory for storage in the ED portion of the selected junctor time. Thus, in accordance with the present invention, there is no need for an information trunk to provide connection between the line and the operator, since the system will merely use the units digit information stored in the junctor memory as an address for the operator position circuit, which is connected as a line appearance to the line matrix. The operator position circuit is then connected via the line matrix to the line circuit in the same manner that the system would connect the line to any other line circuit.

CALLS INITIATED BY THE OPERATOR

Calls to a line or a trunk by the operator are also handled in an extremely simple manner. This is principally due to the fact that the operator loop circuits are connected directly to the matrix as line appearances so that when the operator hits the loop key a loop circuit may be connected to the attendant junctor 80 merely by closing of a selected cross point in the switching matrix. The circuit which performs this function is illustrated in FIG. 6, which clearly illustrates the simplicity of the control circuitry which replaces the previously provided access trunks.

Figure 6:
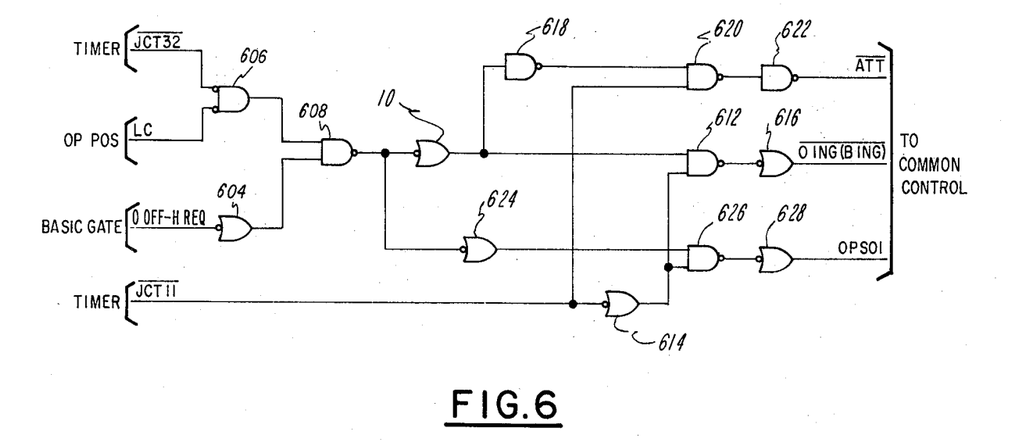
FIG. 6 is a further schematic circuit diagram embodying the present invention.

The gate 608 provides the basic control of the circuit in FIG. 6. One input of this gate is connected to the output of a gate 606 which is enabled at the time JCT32 by the operator loop key signal LC. A second input of the gate 608 is enabled in response to the operator off-hook request signal $\overline{OOFF\text{-}HREQ}$ which is applied via gate 604.

The output of gate 608 is applied along three paths which serve to produce three basic control signals. The first path extends through gate 610 which is connected to one input of AND gate 612. The other input of gate 612 is the time slot signal $\overline{JT11}$ applied through gate 614. The output of gate 612 is applied through gate 616 as the signal $\overline{0ing}$ (B ING), which signal is applied to the common control and serves to take the operator number from the buffer and insert it into the calling portion of the junctor memory. By this signal, the system establishes the operator as the calling party during the time associated to the attendant junctor.

The output from gate 610 is applied along a second path through gate 618 to one input of AND gate 620, the other input of which represents the time slot signal $\overline{JT11}$. The output from gate 620 is applied through gate 622 as the signal $\overline{ATT}$, which signal is also applied to the common control to indicate that the call has been established by the attendant and addresses the attendant's junctor to perform the above operation, $\overline{0ing}$ (B ING).

The output from gate 608 is also applied along a third path through gate 624 to on input of AND gate 626, the other input of which receives the time slot signal $\overline{JT11}$ via gate 614, the output from gate 626 is applied through gate 628 to the status circuit to advance the status of that particular call to state OPSO1 designating the operator's state 1.

The call from the operator then may be handled in the same manner as a call from a line circuit due to the fact that the loop circuits for the operator are provided as line appearance at the input of the matrix and an attendant junctor is provided and controlled by the system for use by the operator. Thus, the operator loop may be connected to the attendant junctor, as seen in FIG. 1a, merely by the closing of a single cross point in the service matrix section to connect the loop to the attendant junctor and closing a single cross point in the tone matrix section to provide dial tone to the operator.

In general, it will be noted that the present invention provides a minimum amount of circuitry for controlling the connection of a line to the operator or the connection of the operator to a line or outgoing trunk. A further advantage of the present invention is derived from the fact that the circuitry which is utilized within the system for effecting access of the operator to a line or outgoing trunk or to provide connection from a line to the operator is not traffic dependent since the circuits which perform these functions are needed only in establishing the connection between the operator and the line or outgoing trunk and may then be used in connection with other calls without affecting the previously established connection between the parties. Thus, the operator complex no longer requires information trunks and access trunks in large number, as was common in prior systems, with the result that the cost and complexity of the system in accordance with the present invention is greatly reduced.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. In an electronic telephone system including a plurality of input circuits comprising subscriber line circuits, a plurality of junctor circuits, a single stage switching matrix in the form of a rectangular array of horizontal and vertical lines and switch means for selectively effecting interconnection between a horizontal line and a vertical line at the cross point thereof, said input circuits being connected to respective horizontal lines and said junctor circuits being connected to respective vertical lines, and common control means for storing the respective multi-digit designations of selected calling and called input circuits and for periodically generating command signals to close selected cross points of said switching matrix to interconnect the calling and called input circuits whose designations are stored, the improvements comprising an operator complex including an operator position circuit connected to at least one operator line circuit which is connected in the manner of an input circuit as a line appearance to said switching matrix, first digit recognition means for recognizing the first digit of the multi-digit designation of a called input circuit generated from a line circuit, operator digit recognition means responsive to said first digit recognition means for recognizing a digit assigned to designate only the operator, and operator control means for controlling calls to and from the operator including first means responsive to said operator digit recognition means for controlling said common control to store the multi-digit designation of an operator line circuit as a called input circuit.

2. The system defined in claim 1 wherein said operator line circuits are connected to said switching matrix as line appearances.

3. The system defined in claim 1 further including means responsive to said operator digit recognition means for signalling said common control means that all digits have been received.

4. The system defined in claim 1 wherein said operator complex also includes a plurality of operator loop circuits connected as line appearances to said switching matrix, said operator control means including second means responsive to receipt of an operator call initiating signal from a loop circuit for controlling said common control to store the multi-digit designation of an operator loop circuit as a calling input circuit.

5. In an electronic telephone system including a plurality of input circuits comprising subscriber line circuits, a single stage switching matrix, said input circuits being connected as line appearances to said switching matrix, and common control means for effecting connection between input circuits through said switching matrix comprising junctor memory means having a memory portion for storing the respective multi-digit designations of the calling and called input circuits of each communication connection to be established through said switching matrix, matrix control means for controlling said switching matrix, status means for storing data representing the status of each communication connection of said input circuits and control circuit means responsive to the data stored in said status means for interconnecting the calling and called input circuits whose multi-digit designations are stored in each memory portion of said junctor memory means, the improvement comprising an operator complex including at least one operator line circuit connected in the manner of an input circuit as a line appearance to said switching matrix, recognition circuit means for detecting that the first digit of the designation of a called input circuit generated from a line circuit is a digit designating only the operator, and operator control means responsive to said recognition circuit means for inserting into said junctor memory means the multi-digit designation of said operator line circuit as a called input circuit.

6. The system defined in claim 5 wherein said operator control means includes means to advance the state of said status means.

7. The system defined in claim 6 wherein said operator control means further includes means responsive to said recognition circuit means for signalling said common control means that all digits have been received.

8. The system defined in claim 5 wherein said input circuits also include a plurality of operator loop circuits connected as line appearances to said switching matrix, said operator control means being responsive to receipt of an operator call initiating signal from a loop circuit for storing in said junctor memory means the multidigit designation of an operator loop circuit as a calling input circuit.

* * * * *